June 19, 1956 — J. A. WELLS — 2,750,838
COMPUTING WEIGHING SCALE AND OPTICAL
PROJECTION VIEWING MEANS
Filed Aug. 20, 1952 — 4 Sheets-Sheet 1

INVENTOR.
JOHN A. WELLS
BY Arthur H. Robert
ATTORNEY

June 19, 1956     J. A. WELLS     2,750,838
COMPUTING WEIGHING SCALE AND OPTICAL
PROJECTION VIEWING MEANS
Filed Aug. 20, 1952     4 Sheets-Sheet 2

INVENTOR.
JOHN A. WELLS
BY Arthur J. Robert
ATTORNEY

June 19, 1956   J. A. WELLS   2,750,838
COMPUTING WEIGHING SCALE AND OPTICAL
PROJECTION VIEWING MEANS
Filed Aug. 20, 1952   4 Sheets-Sheet 3

INVENTOR.
JOHN A. WELLS
BY Arthur J. Robert
ATTORNEY

June 19, 1956

J. A. WELLS 2,750,838

COMPUTING WEIGHING SCALE AND OPTICAL
PROJECTION VIEWING MEANS

Filed Aug. 20, 1952

INVENTOR.
JOHN A. WELLS

BY

Arthur H. Robert

ATTORNEY

United States Patent Office 2,750,838
Patented June 19, 1956

2,750,838

COMPUTING WEIGHING SCALE AND OPTICAL PROJECTION VIEWING MEANS

John A. Wells, Louisville, Ky., assignor to Stimpson Computing Scale Company, Louisville, Ky., a corporation of Kentucky Application August 20, 1952, Serial No. 305,356

10 Claims. (Cl. 88—24)

In the sale of meat and meat products in self service groceries, the present practice is to display portions of various weights wrapped in a transparent wrapper, with the weight and price marked on the package so that the customer can select the desired weight without assistance from the clerk. This practice requires that the meat be wrapped, weighed and priced beforehand and it is necessary that this work of weighing and pricing must be done rapidly and with a minimum of fatigue to the operator, as fatigue tends to promote errors. Scales specially designed for this type of operation are commonly called prepackaging scales.

Heretofore, scales, for prepackaging and other purposes, have been provided comprising: a frame; a computing chart; a housing providing a slot along its sight plane and an enclosed alleyway along the outside of that slot; a ground glass screen on the outer side of the alleyway; and an optical system mounted on the frame for movement along the alleyway to different positions wherein it projects chart data upon the screen.

The principal object of the present invention is to simplify and otherwise generally improve this structure to make it possible and practical to provide it with a chart containing extremely small printed data, in the nature of microfilm data, and throw a suitably magnified projection of selected portions of that data in a clearly visible condition upon the screen where it is not subject to reading errors occasioned, for example, by parallax.

Another important object is to provide a scale having a cover detachably mounted on the housing in position to complete the enclosure of the alleyway and to render the alleyway space readily accessible when detached.

A further object of the invention is to simplify this type of structure by enclosing the optical means substantially within the alleyway and mounting such means on the housing rather than the frame of the scale.

Another object is to provide a simple structure which renders the optical system easy to remove and replace.

Another object is to provide an arrangement which restricts the passage of light from the chart illuminating means within the housing through the sight plane slot into the alleyway so as to darken the alleyway and thereby make the projected image on the screen appear sharper and more readily readable.

The invention will be described in greater detail in connection with the accompanying drawing illustrating a preferred embodiment of the invention by way of example and wherein.

Figure 1:
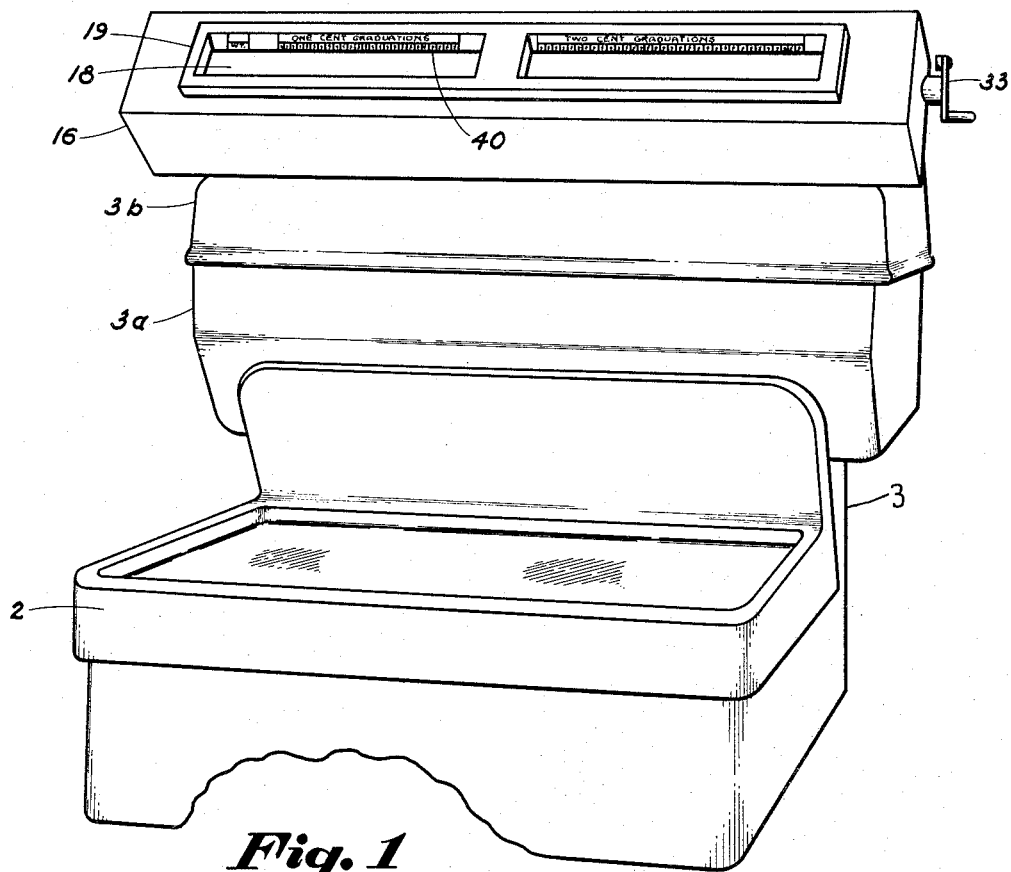
Figure 1 is a perspective view of a scale embodying the invention.
Figure 2:
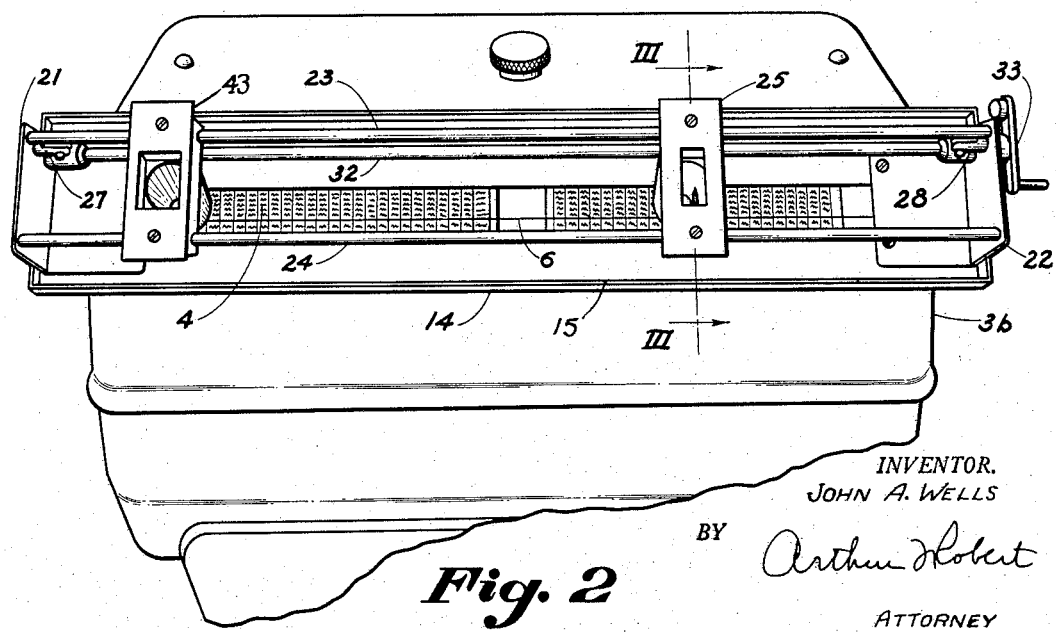
Figure 2 is an enlarged view of a part of Figure 1 with the projector housing and screen removed.

Referring to the drawing, the weighing scale comprises a standard or frame 1 of known construction having a weighing platform or tray 2, and a housing 3 on the frame or standard 1 in which is located the cylindrical chart 4, which has a reflecting surface. This chart is divided into columns extending circumferentially from a base reference line, each column representing a unit price, and the numerals printed in each column show the value of progressively increasing weights of material at the unit price of that column. A section of this chart at one end is divided into units and subdivisions of weights, and is printed with corresponding numerals. The frame or standard carries a hair line 6 representing the sight or reference plane of the scale. It will be obvious that the base reference line of the chart coincides with the sight plane of the scale under no load conditions. The chart is connected in known manner to the weighing tray 2 to be rotationally moved proportionately to the weight placed thereon, and automatically measures by weight and by price at the reference plane.

Figure 3:
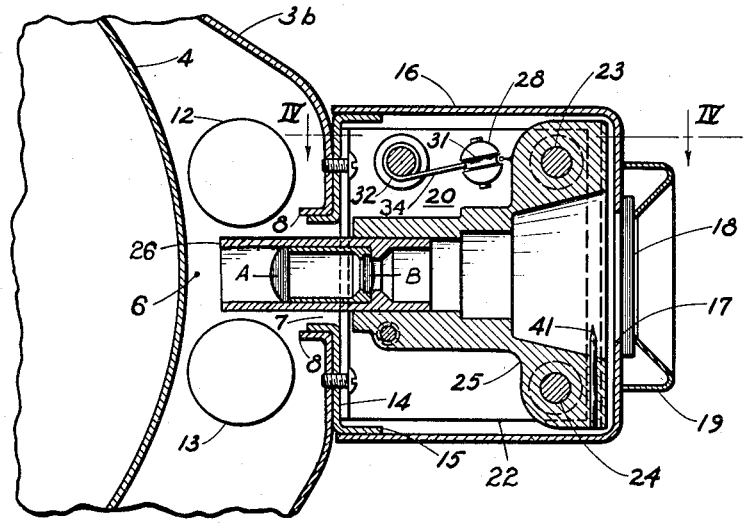
Figure 3 is a cross sectional view taken on line III—III of Figure 2.
Figure 4:
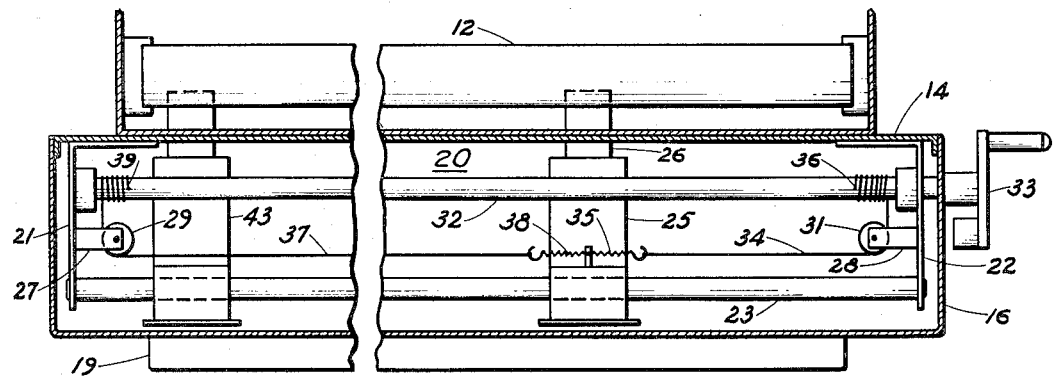
Figure 4 is a cross sectional view taken on line IV—IV of Figure 3.
Figure 5:
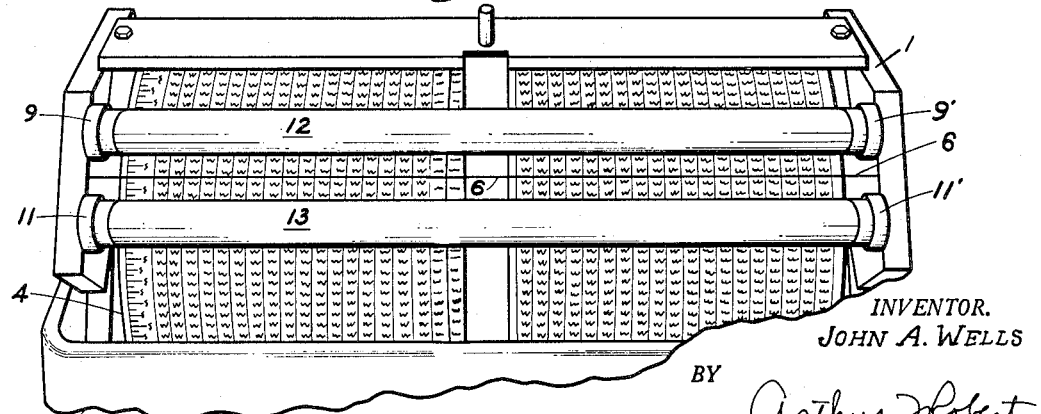
Figure 5 is a view similar to Figure 2 with the top housing removed.
Figure 6:
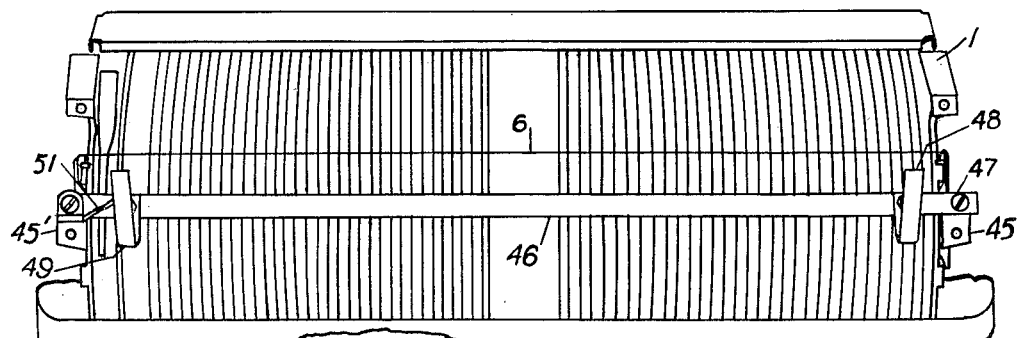
Figure 6 is a view similar to Figure 5 of a modification.
Figure 7:
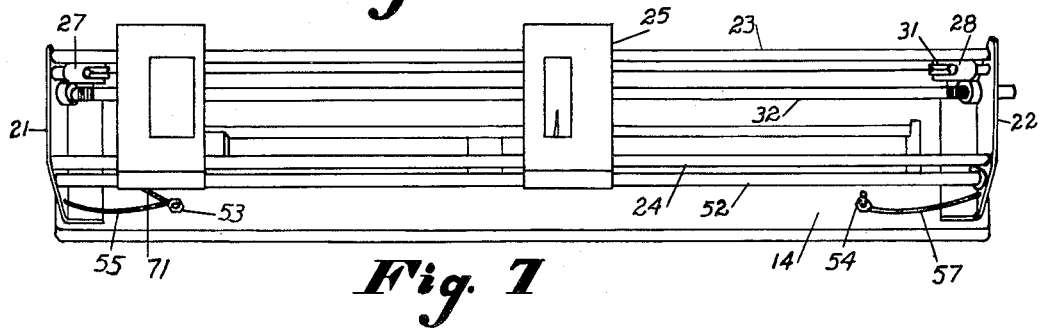
Figure 7 is a view similar to Figure 2 of a modification.
Figure 8:
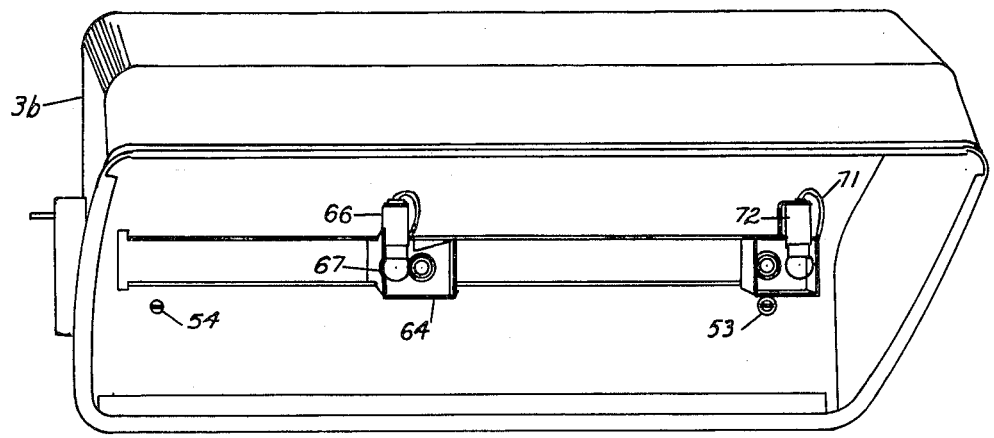
Figure 8 is a view of the inside of the cover.
Figure 9:
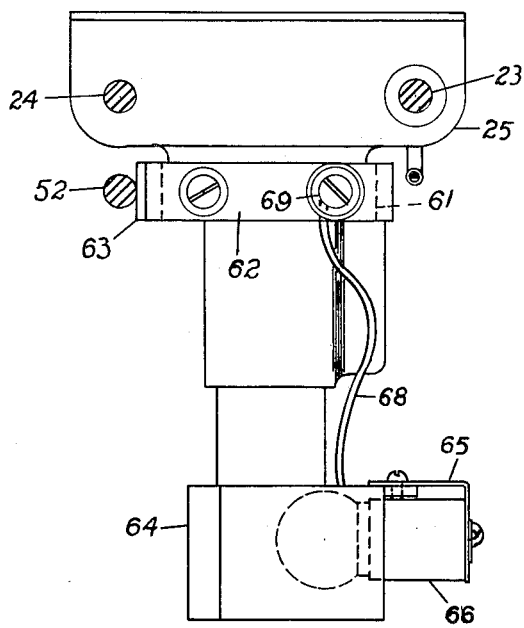
Figure 9 is a side elevation of a projector.
Figure 11:
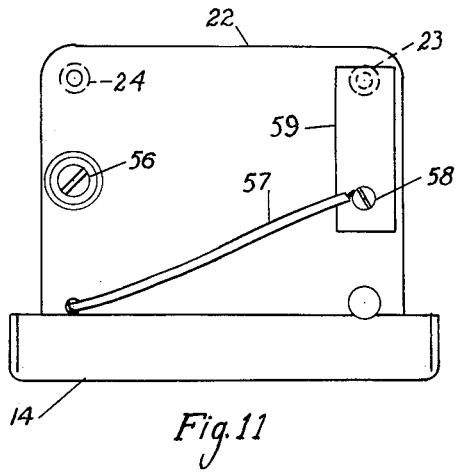
Figure 11 is an end view of a part of Figure 7.
Figure 10:
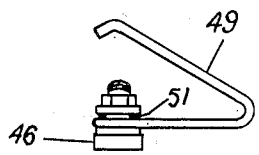
Figure 10 shows a detail.

The part of the housing enclosing the chart conveniently is divided into a lower half 3a and a removable upper half 3b, and the upper half is provided with a suitable opening or slot 7 along its length (Fig. 3), this slot having inturned edges or flanges 8. Pairs of sockets 9, 9' and 11, 11' are arranged on the scale frame within the housing, and receive the fluorescent light tubes 12, 13 arranged above and below the slot 7 behind the flange 8 to illuminate the chart along its length at a zone adjacent the hair line 6. A plate 14 secured to the upper housing has a flanged opening registering with opening 7, and has a circumscribing flange 15. A removable cover 16, in the form of a longitudinal stationary rectangular box, is fastened to this flange and has slot 17 covered by a translucent screen 18 held in place by a rim or bezel 19. It will be seen that slot 17 is in alignment with the sight plane hair line 6 and slot 7 and that the screen 18 is substantially normal to a radial plane of the chart passing through the hair line. An enclosed alleyway 20 thus is provided, between the plate 14 and the screen 18, by housing parts including plate 14, cover 16 and screen 18.

At the ends of plate 14 are suitably secured parallel brackets 21, 22, and a pair of guide rods 23, 24 are carried by these brackets. A carriage 25 is slidably carried on these guide rods for transverse movement through the alleyway, and a tube 26 projects from the carriage through slot 7 to a point adjacent the chart surface. This tube carries a lens system designed to project light reflected from the chart surface, as a magnified real image of the hair line 6 and that portion of the chart numerals closely adjacent thereto through lens A and B upon the translucent screen 18, so the image can be read from the exterior of the screen, and the tube extends close enough to the chart to prevent light from the bulbs directly striking the lens, yet far enough away so it does not shade the chart near the hair line.

The brackets 21, 22 carry respectively yokes or forks 27, 28 in which are suitably journalled grooved pulleys 29 and 31. A winding shaft 32 is journalled in the brackets and one end, which extends through the cover 16, has a crank 33. A flexible cord 34 extending around pulley 31 has one end secured to the carriage 25 by a coil spring 35, and has its other end 36 wrapped around winding shaft 32 in one direction; and another flexible cord 37 extending around pulley 29 has one end secured to carriage 25 by the coil spring 38, and has its other end 39 wrapped in the opposite direction from end 36. Thus it will be seen that when shaft 32 is turned in one direction cord 34 will be wound up while cord 37 will be unwound equally, so as to shift the carriage 25 in the alleyway to a position opposite the desired chart column to be read. The shaft 32 can be rotated by crank 33. The bezel 19 carries a scale 40 graduated in price per units of weight, and a pointer 41 on the carriage cooperates with this scale to show when the projector 25 is opposite the desired price column.

A second projector 43 is mounted upon the bars 23, 24 and is suitably locked in position opposite the weight section of the chart so that the projector projects a magnified real image of the weight numerals of the chart upon the screen 18.

In weighing a commodity the operator turns the crank 33 to shift the carriage 25 until the pointer 41 is opposite the desired number of the unit price index 40, thus showing the carriage is opposite the corresponding price column. He then places the commodity to be weighed upon the scale pan. This arrangement enables the operator to read directly from the screen the weight and total value of the commodity which he then can mark on the wrapper. Because the numerals appear on the screen, he can read them from practically any position, without errors of parallax.

By enclosing the projector in a housing the screen is protected from entrance of adventitious light and the projector is protected against dust or dirt, and accidental displacement; and compactness is achieved by having the image projected substantially on a radial plane. The fixed tubular lights simplify the construction and eliminate movable electrical connections, and supply adequate light to enable easy reading of the projected image in daylight or by artificial light, without unduly illuminating the screen so as to interfere with the brightness of the image projected thereon.

In the modification shown in Figures 6 to 11, the scale frame 1 has apertured lugs or bosses 45, 45' and a brass bar 46 extending across the chart is secured at its ends to the lugs by means of screws 47. Adjacent one end the bar carries a spring contact 48 fastened thereto in electrical conducting relation. At the other end a spring contact 49 is fastened on the bar in an electrically insulated arrangement, and a wire 51 passing through a clip on boss 45' is fastened to the contact 49. Thus contact 48 constitutes a ground connection, and contact 49 is the live connection.

Brackets or plates 21, 22 on the cover carry a brass rail 52, which is fastened to brackets 21, 22 by an insulated fastening. Near the ends bolts 53, 54 pass through the bottom plate 14 and the upper cover 3b in electrically insulated relation. From bolt 53 a wire 55 extends in conducting relation to one of the terminal screws 56 which makes electrical connection with rail 52. A wire 57 from bolt 54 is conveniently connected to the screw 58 which holds fork 28 in place, and a spring plate 59 connects between this screw and the end of rod 23. Thus the live rail 52 is insulated from the scale cover and frame which serves as a ground connection.

The slidable carriage 25 for the projector carries an insulation block 61 upon which is secured a spring shoe 62 having a spring end 63 adapted to slide on rail 52 to provide a sliding electrical contact therewith. The end of the carriage carries a shield 64 and within this shield offset from the lens system a clip 65 carries a socket 66 in which is located a small electric light bulb 67. A wire 68 connected from the socket 66 to a binding post 69 furnishes the live electrical connection to the bulb, and the socket is grounded to the frame to complete the electrical connection. The fixed carriage 43 is similar to carriage 25 but employs a different electrical connection. A wire 71 connected to live bolt 53 leads directly to the socket 72 thereon. When the cover 3b is applied over the scale chart the spring contact 48 engages bolt 54 and spring contact 49 engages bolt 53. If desired, a suitable switch (not shown) operated by the scale when an article is placed on the pan to be weighed energizes the electrical circuit.

I claim as my invention:

1. A computing weighing scale having a sight plane comprising: a frame; a cylindrical, computing chart having a base reference line coinciding with the sight plane under no load conditions; a housing enclosing the chart, providing a sight plane slot extending lengthwise along the adjacent outer face of the chart in a direction generally parallel to the rotational axis of the chart, and forming an enclosed alleyway extending lengthwise along the outer side of said sight plane slot, said housing also providing another slot extending lengthwise along an outer longitudinal side of said alleyway; an image screen over said other slot; and one optical means mounted within said alleyway on an adjacent portion of the housing to project data from the chart upon said screen; said housing including a stationary longitudinal cover detachably mounted on the housing proper in position to extend lengthwise along the alleyway so as to enclose the alleyway and provide for access to the alleyway space when detached.

2. The scale of claim 1 wherein: said optical means is mounted for movement along the alleyway to at least two different predetermined operative positions in each of which it is operative to project data from the chart upon said screen; and guide means, extending lengthwise within and along the alleyway, are provided for supporting and guiding said optical means, said guide means being mounted on an adjacent portion of the housing.

3. The scale of claim 2 wherein said guide means includes: a pair of brackets mounted on the housing to project within the alleyway, one at each end thereof, at least one of the brackets being movable out of its normal position and in a direction relatively away from the other bracket; and a guide rod extending longitudinally through the alleyway from one bracket to the other and mounted on both, said guide rod slidably supporting said optical means and cooperating therewith to form an assembly which, when the cover is removed, can be dismounted as a unit from the brackets upon moving said movable bracket relatively away from the other bracket.

4. The scale of claim 3 including: another optical means stationarily mounted in said alleyway on said rod beyond one end of the travel of said one optical means and forming a part of said dismountable assembly.

5. The scale of claim 2 including: a reversibly rotatable shaft extending lengthwise within and along the alleyway, said shaft being mounted on an adjacent portion of the housing; and means connecting the optical means to the shaft to move the optical means in one direction or the reverse along the alleyway upon corresponding rotation of the shaft.

6. The scale of claim 5 wherein: the shaft and guide means are mounted on a pair of brackets, one secured to the housing at each end of the alleyway to project into the alleyway.

7. The scale of claim 1 wherein: that portion of the housing providing the sight plane slot is spaced outwardly from the chart; chart illuminating means are mounted adjacent said sight plane slot and between the chart and housing; and shielding means are provided between the illuminating means and the interior of the alleyway to minimize the passage of extraneous light around the outside of the optical means from within the housing through the slot and alleyway on to the screen.

8. A computing weighing scale having a sight plane comprising: a frame; a cylindrical, computing chart having a base reference line coinciding with the sight plane under no load conditions and a transverse series of columns extending circumferentially from the base line, including a column showing progressively increasing weights and at least two different unit price columns, each showing progressively increasing total prices corresponding to said weights at its unit price; a housing providing a sight plane slot extending lengthwise along the adjacent outer face of the chart in a direction generally parallel to the rotational axis of the chart; a longitudinal stationary rectangular box open at one side and detachably secured to the housing with its open side extending over the sight plane slot, said box and housing forming an enclosed alleyway extending lengthwise along the outer side of said sight plane slot, said box containing a slot extending lengthwise along an outer side of said alleyway in alignment with said sight plane slot and carrying an image screen over said outer slot; one optical means positioned within said alleyway and mounted on an adjacent portion of the housing for movement along the alleyway to at least two different predetermined operative positions corresponding to said different price columns, said optical means being operative in each position to project price data upon the screen from the corresponding price column; and another optical means positioned within said alleyway stationarily mounted on an adjacent portion of the housing in position to project weight data upon the screen from said weight column.

9. The scale of claim 8 including: unit price data positioned on said box for each price column along the outer face of said image screen, the data for each column being in alignment with that column.

10. The scale of claim 8 including: guide means extending lengthwise within and along the alleyway for supporting both of said optical means and for guiding said movable optical means, said guide means being mounted on an adjacent portion of the housing.

References Cited in the file of this patent

UNITED STATES PATENTS

| | | |
|---|---|---|
| 1,357,731 | Schaper | Mar. 2, 1920 |
| 1,402,970 | Schaper | Jan. 10, 1922 |
| 1,487,514 | Goss | Mar. 18, 1924 |
| 1,715,074 | Platten | May 28, 1929 |
| 1,804,464 | Fuller | May 12, 1931 |
| 1,855,928 | Sherer | Apr. 26, 1932 |
| 1,987,245 | Reussenzehn | Jan. 8, 1935 |
| 2,013,592 | Von Pein | Sept. 3, 1935 |
| 2,223,773 | Williams | Dec. 3, 1940 |
| 2,541,365 | Kauffman | Feb. 13, 1951 |
| 2,638,813 | Van Duyn | May 19, 1953 |
| 2,679,190 | Van Duyn | May 25, 1954 |
| 2,697,963 | Fink | Dec. 28, 1954 |